United States Patent [19]

Hunter et al.

[11] Patent Number: 5,666,292

[45] Date of Patent: Sep. 9, 1997

[54] EXTERNAL INTERFACE UNIT HAVING MESSAGE ROUTING AND PROTOCOL CONVERSION

[75] Inventors: Kevin D. Hunter, Stratford; Perry A. Pierce, Darien, both of Conn.

[73] Assignee: Pitney Bowes Inc., Stamford, Conn.

[21] Appl. No.: 357,174

[22] Filed: Dec. 13, 1994

[51] Int. Cl.$^6$ .................................................. G06K 15/00
[52] U.S. Cl. ................................................ 395/882; 370/389
[58] Field of Search ........................ 364/514 R, 464.02, 364/514 A; 370/60, 60.1, 85.5, 85.1, 85.2, 85.13, 352, 355, 368, 371, 378, 389; 395/280, 309, 310, 821, 822

[56] References Cited

U.S. PATENT DOCUMENTS

| | | | |
|---|---|---|---|
| 4,410,962 | 10/1983 | Daniels et al. | 364/900 |
| 4,422,148 | 12/1983 | Soderberg et al. | 364/464 |
| 4,466,079 | 8/1984 | Daniels et al. | 364/900 |
| 4,498,187 | 2/1985 | Soderberg et al. | 375/117 |
| 4,675,841 | 6/1987 | Check, Jr. et al. | 364/900 |
| 4,715,030 | 12/1987 | Koch et al. | 370/85 |
| 4,807,141 | 2/1989 | Muller | 364/464.02 |
| 4,831,554 | 5/1989 | Storace et al. | 364/519 |
| 4,918,601 | 4/1990 | Vrmesse | 364/464.02 |
| 5,128,875 | 7/1992 | Abumehdi et al. | 364/464.02 |
| 5,200,903 | 4/1993 | Gilham | 364/464.02 |
| 5,206,812 | 4/1993 | Abumedhi | 364/464.02 |
| 5,309,363 | 5/1994 | Graves et al. | 364/464.02 |
| 5,434,864 | 7/1995 | Perlman et al. | 370/85.13 |
| 5,440,690 | 8/1995 | Rege et al. | 395/200.02 |
| 5,461,625 | 10/1995 | Cho | 370/85.5 |
| 5,515,376 | 5/1996 | Murthy et al. | 370/85.13 |

*Primary Examiner*—Hassan Kizou
*Assistant Examiner*—Kwang Bin Yao
*Attorney, Agent, or Firm*—Angelo N. Chaclas; Charles G. Parks, Jr.; Melvin J. Scolnick

[57] ABSTRACT

An interface apparatus is provided with a number of communication ports for providing a communication interface between a postage meter and a plurality of external devices, such as, a scale and a modem. A principal communications port connectable to the postage meter. A secure communication port is provided for receiving messages on a secure scale using encrypted protocol signals. The interface unit includes an additional number of unsecured ports for communication with unsecured devices such as a modem or an unsecured scale utilizing conventional protocol signals. The interface further includes a programmable microcontroller in bus communication with a random access memory, a non-volatile memory and a program memory, a first communication bus connecting the principal port to the microcontroller and a second communication bus connecting one or more of the second communication ports to the microcontroller. The microcontroller of the interface unit is programmed to establish a communication link between one of the second communication ports and the principal port pursuant to a communication request signal from the principal port identifying which of the second communication ports for communication. Conversely, the microcontroller can establish a communication link between the second communication port and the principal communication port pursuant to a communication request from one of the second communication ports. The messages being communicated are comprised of a number of message frames and each of the message frames has a header, one of headers being designated for message frames which are intended to be directed to the interface unit. The interface unit monitors the header portion of each message frame and stripping the message frames from the messages having the designated message frame header for messages intended as instructions for the interface unit. An established communication link can be interrupted when a message having the designated message frame header and message frame instructs the microcontroller to establish communication between the microcontroller and the postage meter through principal port.

5 Claims, 2 Drawing Sheets

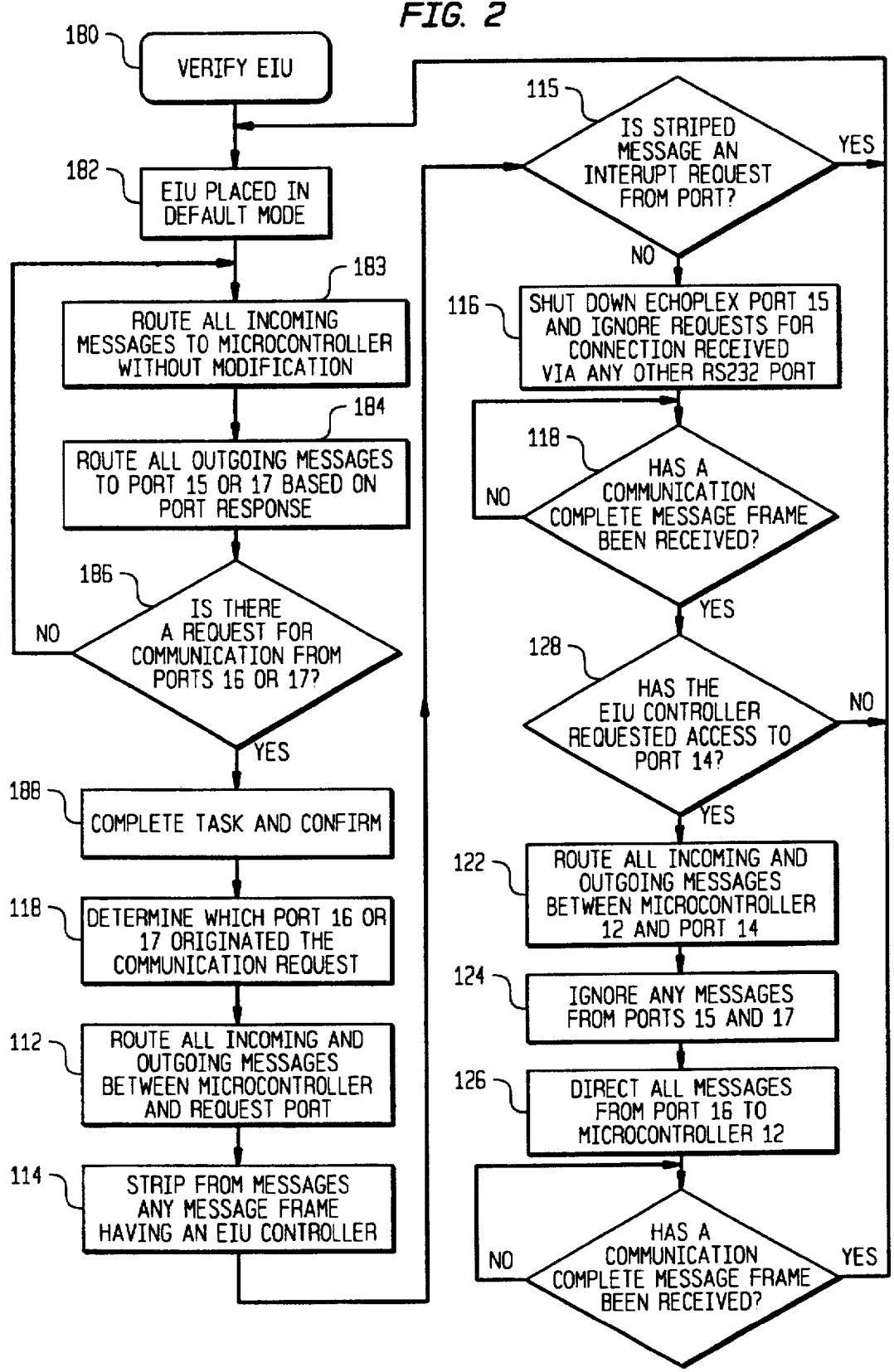

EXTERNAL INTERFACE UNIT HAVING MESSAGE ROUTING AND PROTOCOL CONVERSION

BACKGROUND OF THE INVENTION

The present invention relates to micro control devices having the capability of communicating with an external device through a communication port and, more particularly, to postage meters, and like devices, having a micro control system enclosed in a secure housing wherein the micro control system is suitable for communicating secured or unsecured information through a communication port between the meter and the external device.

It is customary to provide a fully featured meter with a number of communication ports, e.g., a port for secure communication between the meter's secure printing and accounting system with an external device, such as a echoplex scale, and one or more ports for non-secure communication, such as, with a computer. An echoplex scale refers to a scale with the ability to set the meter's posting amount using a secure communication protocol, such as described in U.S. Pat. No. 4,525,785, entitled Electronic Postage Meter Having Plural Computing Systems. An example of unsecured communication is the use of a standard RS232 protocol for the printing of unsecured departmental account information by an external printer.

Providing a meter with full communication capability presents a cost consequence to the user, which the user, in many instances, wishes to defer until such time as the user can cost justify the additional capabilities and features. The user would also like to obtain the deferred features at an incremental cost.

SUMMARY OF THE INVENTION

It is an objective of the present invention to present an external interface unit (EIU) for providing a communication link between a postage meter, and like devices, and one or more external devices.

It is a further objective of the present invention to present an EIU for providing a communication link with protocol conversion between the postage meter or like device and one or more external devices.

It is a further objective of the present invention to present an EIU which provides a communication link with protocol conversion between postage meter, or like device, and one or more external units devices wherein the EIU operates in three possible modes: a default (passive routing) mode in which the EIU is essentially transparent to messages except that protocol conversion takes place; pipe mode in which an external device is connected to a standard protocol port, e.g., RS232 port, and the EIU enjoys priority communication with the postage meter, again with protocol conversion, if required; and a master mode in which the dedicated communication link exists between the EIU and the meter.

The EIU includes a microcontroller in buses to a series of four external ports. One of the ports is a conventional protocol port which permits communication between the EIU and the postage meter. In the preferred embodiment, the protocol utilized is a variation of the standard RS 232. Alternatively, communication between the EIU and the meter may employ a suitable security communication protocol, such as a protocol referred to as echoplex described in U.S. Pat. No. 4,301,507 and U.S. Pat. No. 4,525,785. A second port 15 is an echoplex port, specifically adapted by of an echoplex control ASIC within the EIU to communicate with a echoplex device, such as a echoplex scale. A third and fourth port is provided for facilitating communication between any suitable device such as a modem, computer or an additional scale. Each of the ports communicate with the meter through the EIU microcontroller and a suitable integrated circuit (ASIC).

The EIU is programmed to operate in three communication modes. A passive routing mode in which the software programmed into a PROM of the EIU instructs the microcontroller to route any incoming message to be outputted without modification at the meter port. When the EIU operates in passive routing mode, any responses from the meter, which in the native mode is provided using an echoplex protocol, are routed by the EIU microcontroller and sent to the second and fourth ports which are principally Intended to be associated with a scale, however, the fourth may have other devices connected thereto. Since, only the echoplex scale can understand the response, and the respective ports are connected to different pins of the microcontroller, the microcontroller is able to discriminate based on the destination port protocol between echoplex scale devices attached to the second port and route outgoing messages from the meter to that port. The passive routing mode operates when other intelligent devices connected to the EIU are silent.

The second mode of communication is referred to as the 'pipe' mode of operation of the EIU. When the EIU is in pipe mode based on a request from one of the external devices, all device communications are routed directly to the meter port and all meter derived communications are routed directly to the port communicating with the requesting device. When the EIU operates in pipe mode, the second (echoplex) port is shut down and requests for connection received via any other port are ignored. When communication between the external device and the meter is complete, a confirmation of completion message is sent to the EIU. This causes the microcontroller of the EIU to return under control of the PROM to passive routing mode, i.e. the default mode of operation.

The third mode of EIU operating is a 'master' mode. This mode is similar to pipe mode in that the EIU becomes a dedicated communication bus, but in master mode the dedicated communications link is between the EIU and the meter. Master mode is of use when it is necessary for the EIU to communicate internally generated messages to the meter. In master mode the echoplex port and the standard communication ports are effectively closed.

The EIU presents general advantages for providing expanded communication to a principal unit and specific advantages when used in combination with a postage meter, such other specific advantages of the invention are preceived by one in the art from a reading of the following detailed description.

BRIEF DESCRIPTION OF THE DRAWINGS

FIG. 2 is a logic flow diagram of the operational programming of the EIU in accordance with the present invention.

DETAILED DESCRIPTION OF THE PREFERRED EMBODIMENT

Figure 1:
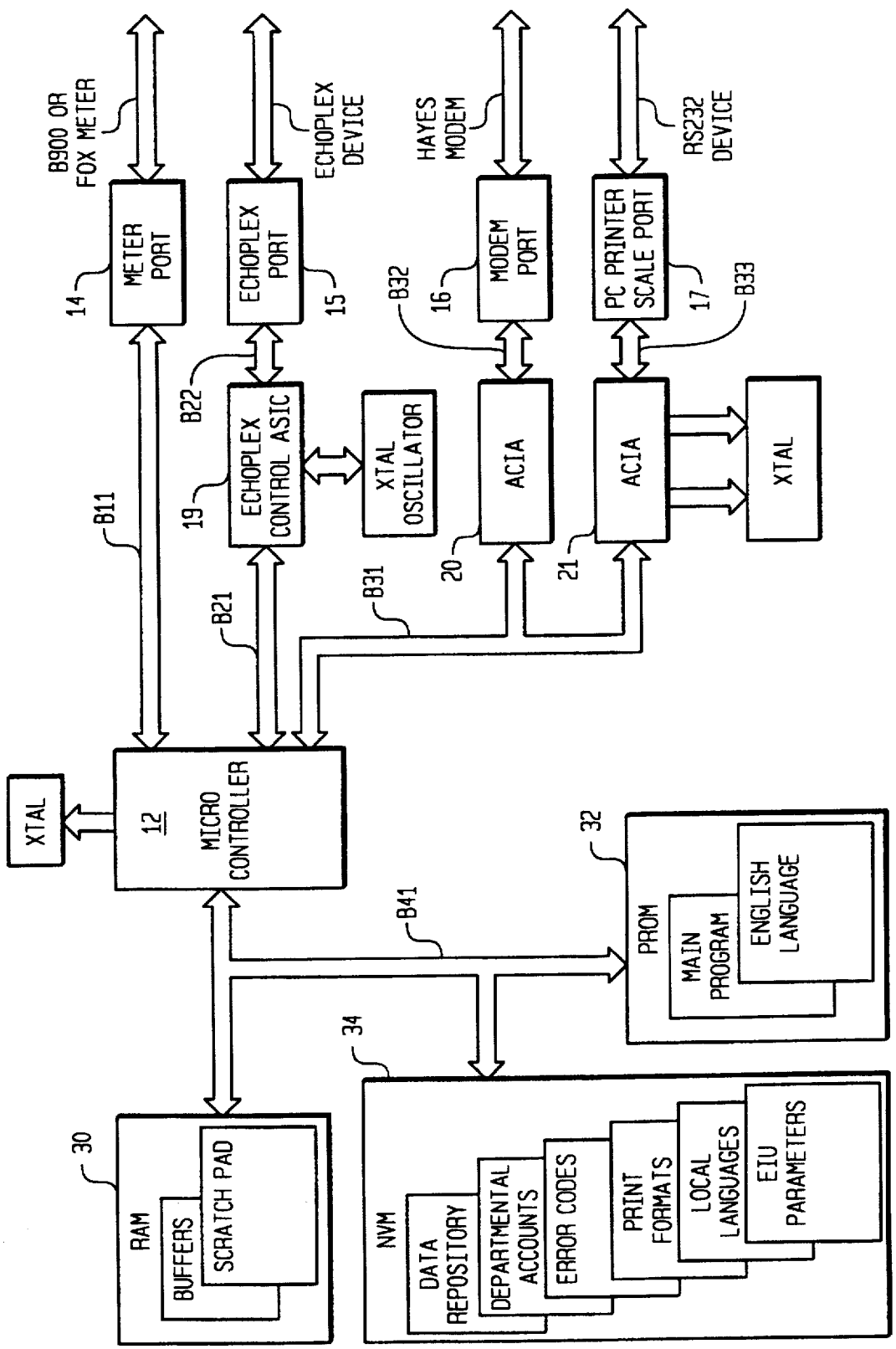
FIG. 1 is a schematic of the EIU micro control system in accordance with the present invention.

Referring to FIG. 1, the EIU 10 includes a microcontroller 12, a number of control ASIC's 19, 20 and 21, and number of ports 14, 15, 16, and 17. Port 14 is a dedicated meter port 14 and port 15 is a dedicated echoplex port. Ports 16 and 17 are respectively RS 232 ports suitable for connection with a modem and an RS 232 device such as a printer, a computer or an additional echoplex or non-echoplex scale. The echoplex port 15 is in bus B22 communication with an echoplex control ASIC 19. In like manner, the port 16 is in bus B32 communication with an ASIC 20 and the port 17 is in bus B33 communication with a ASIC 21. The ASIC 19 is also in communication with a microcontroller 12 through a bus B21. The ASIC's 20 and 21 communicate with the microcontroller 12 through a bus B31. The meter port 14 communicates directly to the microcontroller 12 through a bus B11. Each bus B11, B21 and B31 are at one end connected to individual pins of the microcontroller 12.

The EIU further includes a random access memory 30, a program memory 32 and a non-volatile memory 34, all in bus B41 communication to the microcontroller 12. One of the functions of the EIU is as a data repository for the meter, facilitated by the communication between the EIU and the meter, the meter can off-load certain system functions as optional systems with the use of an EIU. For example, stored in the EIU's can be non-secure accounting data, such as, departmental accounts. Also, the EIU may be used to facilitate international marketing by including in the non-volatile memory of the EIU local languages which can be accessed by the meter's human interface system, a variety of external printer formats. Also, preferably, stored in the non-volatile memory of the EIU are meter error codes which can be access through, for instance, the modem port for system diagnostic, miscellaneous meter data and EIU parameters.

Referring to FIG. 2, when the EIU is plugged into the communication port of the meter and the meter is powered-up, any suitable verification procedure known to the art is performed at logic step 100. Once the verification process is completed, the EIU is placed in the default mode or passive routing mode at logic step 102. In the passive routing mode, the EIU is essentially transparent to the devices communicating through it. This mode of operation is intended to permit communication between the meter and a scale. When the meter is in passive routing mode, the software programmed into PROM 32 of the EIU 10 instructs the microcontroller 12 to route any incoming scale class message to be outputted without modification at the meter port 14, for transmission to the meter, at logic step 103. Under normal circumstances, the scale would be connected most probably to port 15, or possibly to port 17. When the EIU operates in passive routing mode, the port 15 or 17 is connected to a scale. Becoming the default ports are 15 and 17, any responses from the meter are routed by the microcontroller 12 to the port 15 or 17 at logic step 104. Since the scale connected to port 15 operates using the echoplex or other secure protocol from the scale connected to port 17 and, further in combination, the respective ports 15 and 17 are connected to different pins of the microcontroller 12, the microcontroller 12 is able to discriminate between the devices attached respectively to the ports 15 and 17 and route outgoing messages from the meter to the appropriate port 15 or 17.

Passive routing mode operates when other intelligent devices connected to the EIU are silent. Thus, if there is, for example, a scale attached to echoplex port 15; a modem attached to modem port 16 and a computer attached to modem port 17, passive routing mode will only operate when no messages flow via the modem and PC ports 16 and 17. If, for example, a computer is connected to port 17 and initiates communication with the EIU with a request for connection to the meter via port 14 at logic step 106, the microcontroller acting under the control of PROM 32 sends a command via meter port 14 to the meter to complete the current task and confirm such completion at logic step 108. Otherwise, at logic step 106, the control program returns to logic step 103 in the default mode. If the request has been made at logic 106, once the microcontroller receives confirmation of completion of the current task from the meter, the microcontroller determines which port 16 or 17 has made the request at logic block 110. The EIU, then in effect, becomes a dedicated communication bus between the requesting port 16 or 17 and meter port 14 at logic block 112. The EIU is now in the second mode of communication, known as the 'pipe' mode of operation of the EIU. When the EIU is in pipe mode, all communications from port 16 or 17 are routed directly to the meter port 14 and all meter derived communications are routed directly to the appropriate port 16 or 17.

It is possible, any given message between the device in communication with port 16 or 17 and the meter may include message frames that constitute instructions to the EIU or data to be stored in the EIU's NVM 34. These frames are identified by a EIU header and are automatically stripped by the EIU as the message passes through the microcontroller 12 at logic step 114. When the EIU operates in pipe mode, the echoplex port 15 is shut down and requests for connection received via any other RS 322 port are ignored at 116. When communication is completed, the device will send a confirmation of completion message to the EIU. Once the message complete is received, the microcontroller 12 returns to the passive routing mode, i.e., the default mode of operation at logic step 118. Any RS 322 level device connected either to port 16 or to port 17 could initiate pipe mode as long as the device is programmed to send the correct request for connection to the meter. Thus, pipe mode could be initiated remotely via the modem port 16. This would advantageously allow interrogation of the meter from a remote location such as a data center or postal authority office.

The EIU 10 is also capable of operating in a third mode, known as 'master' mode pursuant to the initiation of the EIU microcontroller 12 at logic step 120. This mode is similar to pipe mode in that the EIU becomes a dedicated communications bus, but in master mode the dedicated communications link is between the EIU and the meter port at logic step 122. Master mode is of use when it is necessary for the EIU to communicate internally generated messages to the meter. This occurs, for example, when the EIU software initiates an accounting (data recording) operation that involves reading the registers of the meter for storage in the EIU's NVM 25. In master mode, the echoplex port 15 and the RS 322 port 17 are effectively closed at logic step 124, but the modem port 16 is kept open. All communication from port 16 is directed to the microcontroller 12 at logic step 126. This allows data transfer between the modem port 16 and the EIU or the meter, according to the EIU command. During remote recharging of the meter, the EIU would operate in master mode, but modem messages would not pass directly and unaltered to the meter port 14.

As indicated in logic step 114, it is possible to initiate master mode while the EIU is nominally set to pipe mode. This may be regarded as a subset of pipe mode, and permits the transmission of specific control messages, e.g., to the EIU from a computer, for example, connected at port 17. Under these circumstances, the message from port 17 may include an interrupt request at 115 which then causes the system to enter the default mode. The computer can thereby gain access to the meter through the EIU. When a printer is connected to RS 322 port 17, printer messages from the meter to the printer are modified by the EIU. Specifically, some HEX bits are stripped from the messages as they pass through the EIU, so that only ASCII data is sent to the printer. This avoids the possibility of the printer messages generated in the meter corrupting the printer commands.

The EIU 10 is capable of converting messages in echoplex protocol received at port 15 to a suitably modified protocol for transmission at port 14, and vice versa. The CPU 12 adds appropriate headers, data size bits and message terminator bits to echoplex (Hex) data, thereby converting echoplex messages into the modified RS232 protocol for communication to the meter, and similarly repackages meter messages into echoplex protocol for communication at echoplex port 15. The latter operation is accomplished by removal of the headers, data size information and termination messages in the CPU 12. The ASIC simultaneously adjusts the timings between various significant bits in the messages to ensure correct operation.

What is claimed is:

1. An interface apparatus having a plurality of communication ports for providing a communication interface between a principal device and a plurality of second devices for the transfer of messages, the interface apparatus comprising:

a principal communications port connectable to said principal device;

a plurality of second communication ports, each of said second communication ports having means for receiving and transmitting messages in accordance with specific protocol signals designated for said respective port;

program means including a programmable microcontroller in bus communication with a random access memory, a non-volatile memory and a program memory, a first communication bus connecting said principal port to said microcontroller and a second communication bus connecting one or more of said second communication ports to said microcontroller;

said program means for establishing a communication link between one of said second communication ports and said principal port pursuant to a communication request signal from said principal port or one of said second communication ports, and for receiving said protocol signal inclusive of said messages from said second communication port and directing said messages to said principal device and conversely for receiving messages from said principal device and directing said messages in corresponding protocol to said one of said second communication ports;

said messages having a plurality of message frames and each of said message frames having a header, one of said headers being designated for messages frames which are intended to be directed to said interface apparatus, said program means further having means for reviewing said header portion of said messages frame and stripping said messages frame from said messages having said designated message frame header, means for maintaining said communication link until a message having said designated message frame header is received, wherein said message frame instructs said program means to terminate communication, and means for interrupting said established communication link when said message having said designated message frame header is received, wherein said message frame instructs said program means to establish communication between said program means and said one of said second communication ports;

said message frames having said designated message frame header containing control instruction for said program means.

2. An interface apparatus having a plurality of communication ports for providing a communication interface between a principal device and a plurality of second devices for the transfer of messages within a given protocol, the interface apparatus comprising:

a principal communications port connectable to said principal device;

a secure communication port for receiving messages in accordance with encrypted protocol signals designated for said secure communication port;

a plurality of second communication ports each of said second communication ports have means for receiving messages in accordance with specific protocol signals designated for said respective port;

a programmable microcontroller in bus communication with a random access memory, a non-volatile memory and a program memory, a first communication bus connecting said principal port to said microcontroller and a second communication bus connecting one or more of said second communication ports to said microcontroller;

said microcontroller having program means for establishing a communication link between one of said second communication ports and said principal port pursuant to a communication request signal from said principal port or one of said second communication ports and for receiving said protocol signal inclusive of said messages from said second communication port and directing said messages to said principal device and conversely for receiving messages from said principal device and directing said messages in corresponding protocol to said one of said second communication ports;

said messages having a plurality of message frames and each of said message frames having a header, one of headers being designating for message frames which are intended to be directed to said interface apparatus;

said program means further having means for reviewing said header portion of said messages frame and stripping said message frame from said messages having said designated message frame header;

said message frames having said designated message frame header contain control instruction for said program means;

said program means further provides means for interrupting said established communication link when a message having said designated message frame header is received, wherein said message frame instructs said program means to establish communication between said program means and said principal port.

3. An interface apparatus as claimed in claim 2 wherein said program means further provides means for maintaining said communication link until said message having said designated message frame header is received wherein said message frame instructs said program means to terminate communication.

4. An interface apparatus as claimed in claim 3 wherein said program means further provides means for interrupting said established communication link when said message having said designated message frame header is received, wherein said message frame instructs said program means to establish communication between said program means and said one of said second communication ports.

5. An interface apparatus as claimed in claim 4 wherein said interface apparatus is principal port is detachably mounted to a principal device wherein said principal device is a postage meter.

* * * * *